United States Patent [19]

McClure et al.

[11] 4,306,116
[45] Dec. 15, 1981

[54] COMMUNICATIONS UNIT FOR VOICE AND DATA

[75] Inventors: R. Bruce McClure, Harvard; David E. Williams, Andover, both of Mass.

[73] Assignee: Intertel, Inc., Andover, Mass.

[21] Appl. No.: 99,549

[22] Filed: Dec. 3, 1979

[51] Int. Cl.³ .................................. H04M 11/00
[52] U.S. Cl. .............................................. 179/2 DP
[58] Field of Search ............... 179/2 DP, 2 AM, 3, 4; 340/147 R, 149 A, 150, 152 R

[56] References Cited

U.S. PATENT DOCUMENTS

| | | | |
|---|---|---|---|
| 3,475,557 | 10/1969 | Morse et al. | 179/2 DP |
| 3,962,546 | 6/1976 | Hashimoto | 179/2 DP |
| 4,009,342 | 2/1977 | Fahrenschon et al. | 179/2 DP |
| 4,076,961 | 2/1978 | Holsinger et al. | 179/2 DP |

OTHER PUBLICATIONS

Bell System Technical Reference, "Data Access Arrangement CDT For Manual Originating and Answering Terminals," May, 1971.

*Primary Examiner*—Joseph A. Popek
*Attorney, Agent, or Firm*—Cesari & McKenna

[57] ABSTRACT

A communications unit that allows alternate voice and digital data transmissions over a single telephone line. A communications unit, at each of two locations that connect through telephones, includes a trunk signal path that connects to a telephone line and a telephone signal path that connects to the telephone. A digital data signal path connects to digital data processing equipment, usually in the form of an input/output unit in a digital data processing system. A monostable switch interconnects the telephone line and trunk signal paths in a stable conduction to enable voice communications. When the digital data signal path is used, a control automatically shifts the monostable switching means to its astable state thereby to isolate the telephone signal path and to interconnect the trunk signal path and the digital data signal path to allow data communications. When the data communications end, the control automatically allows the switching means to return to its stable state thereby to again enable voice communications. A testing and monitoring unit connects to the telephone signal path, the digital data signal path, and the control means to enable selective testing and monitoring of the communications unit.

28 Claims, 8 Drawing Figures

COMMUNICATIONS UNIT FOR VOICE AND DATA

BACKGROUND OF THE INVENTION

This invention generally relates to communications over telephone lines and more specifically to units at different locations for conveying voice signals and digital signals over these telephone lines.

This invention is particularly adapted for use with digital data processing systems that include digital data processing equipment and programs for operating that equipment. These programs can be divided into two categories: (1) operating programs that control the interaction between the elements in the digital data processing equipment and (2) application programs for performing specific functions or tasks, such as word processing, data retrieval, and physical process control tasks. The application programs usually are processed by the equipment under the supervision of one of more of the operating programs.

There are three classes of vendors of such systems. One class sells products that comprise entire systems including equipment, operating programs, and application programs. Products from a second class of vendor include only the equipment or only the equipment and operating programs. The customer then prepares his own application programs or purchases them as products from still a third class of vendor.

Vendors in each class must normally provide some assistance to their customers to correct malfunctions or to facilitate use of their products. There are several approaches to providing such assistance. For some customer installations there may be justification for employing a technically qualified person at the customer's location on a permanent basis. In smaller installations, such expense will not be justified, so the customer may designate an employee, who has no specific training, to act as an operator and a liaison with the vendor. The vendor then provides guidance to the operator.

With these, or other, approaches to customer assistance, the operator discusses problems with a vendor representative. Currently, this is accomplished by telephone or by a visit from the vendor representative. If operating data from the system is required and a telephone conference is being conducted, the vendor representative instructs the operator in the specific steps for obtaining that data. When the data is obtained, the operator reads it to the vendor representative over the telephone, or it may be sent to him by mail. This procedure is tedious. Moreover, the vendor may be reluctant to allow an inexperienced person access to all parts of the system, especially the operating programs, as incorrectly performed procedures could have disastrous effects on the customer's data and/or programs.

When the telephone procedure is not effective, the vendor representative visits the customer to provide direct assistance. Delays in the arrival of the representative may be unacceptable to the customer if system operation is critical to the customer's business. Moreover, such visits are not efficient because the representative oftentimes will spend more time traveling than he will providing assistance.

In accordance with another, more sophisticated, approach, conventional digital data communications capability is provided at each customer location and at the vendor's location. The customer calls the vendor and explains the problem to the representative. The representative places a separate call to an allocated telephone number of the customer's equipment and communicates with the system through the data communications equipment. Then the representative calls the customer back to explain the problem and solution or to obtain additional information.

There are a number of problems with this approach. Most importantly, communications between the vendor representative and the customer and his system are cumbersome. Two telephone connections must be made, and the customer will usually have to incur the expense of dedicating a telephone trunk to the system and of connecting this trunk to the system. Sometimes the system malfunction may result from errors in operator procedure. When this occurs, it is very desirable for the representative to describe the errors and show them visually to the customer, which is not easily done with this approach. The customer cannot observe actions of the vendor representative, unless special programs or equipment modifictions are made, so it is more difficult to explain problems and solutions. Security is also a problem. Once the vendor has access to a telephone connection to the customer's system, it is difficult to monitor and control his access to the system. Consequently, unauthorized and undetected access is possible.

SUMMARY

Therefore, it is an object of this invention to provide a communications unit for interconnecting a telephone line, a telephone, and digital data processing equipment.

Another object of this invention is to provide a communications unit that facilitates vendor assistance to a customer of the vendor's data processing equipment or program product.

Yet another object of this invention is to provide a communications unit that enables a party at a remote location to utilize another party's data processing system under the strict control of the other party.

Still another object of this invention is to provide a communications unit that enables modulated carrier signals representing digital data and voice signals to be transferred over a single telephone connection automatically.

A communications unit constructed in accordance with this invention includes a monostable switching circuit. In its stable state, the switching circuit couples a telephone signal path from a telephone to a trunk signal path thereby to establish voice communications over a telephone line. When the switching circuit assumes its astable state, it couples a digital data signal path from digital data processing equipment to the trunk signal path thereby to establish digital data communications over the telephone line. The switching circuit assumes its astable state whenever the digital data signal path is in use. As a result, a single telephone line can be used during one telephone call for voice communications when the switching circuit is in its stable state and for digital data communications when the switching circuit is in its astable state.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

A. General Description and Operation

Figure 1:
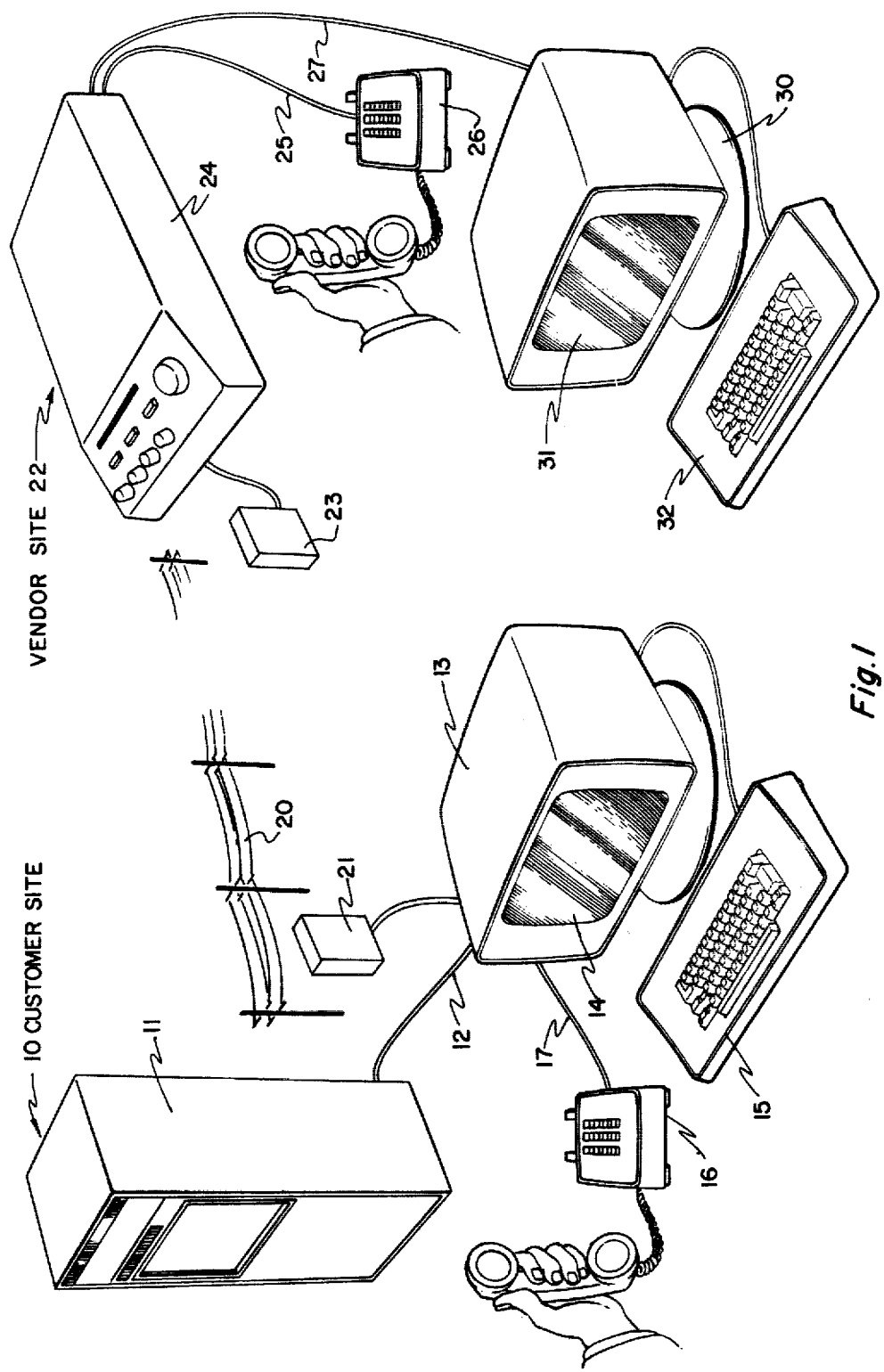
FIG. 1 is a pictorial view that depicts the use of this invention.

This invention is most readily understood by first describing its typical use. Referring to FIG. 1, a customer site 10 comprises a data processing system 11 that normally communicates with a number of input/output terminals. A cable 12 connects the data processing system 11 to one such terminal 13 that includes a CRT display 14 and a keyboard 15. An operator at the customer site 10 transfers information into the data processing system 11 through the keyboard 15 and views the results on the display 14. The specific terminal that is shown in FIG. 1 is for purposes of explanation only, and it will be apparent that other terminals, such as input-/output typewriters, can be substituted for this particular terminal 13. Moreover, there are a variety of well known ways for transferring data between an input device, such as the keyboard 15, and an output device, such as the display 14. Two specific examples are indicative. In some data processing systems, the terminal 13 couples data from the keyboard 15 simultaneously to the system 10 and to the display 14. In other systems, the system 11 receives the information from the keyboard 15 and then transmits, or "echoes", the corresponding information to the display 14. In any such system, however, the operator sees on the display 14 what is being typed on the keyboard 15.

The operator obtains assistance by using a conventional telephone 16. A cable 17 connects the telephone 16 to a communications unit (not shown) that is located in the terminal 13 and that is constructed in accordance with this invention. In a normal operating condition, the communications unit couples signals from the cable 17 to a telephone switching system 20 through a telephone interface 21. The system 20 includes switches, conductors, amplifiers and other commercial telephone switching equipment. In FIG. 1 the system 20 is represented by telephone lines. To obtain assistance, the operator removes the handset from the telephone 16 and "dials" a telephone number for a vendor site 22

When the telephone system 20 connects to the vendor site 22, signals pass through a telephone interface 23 to a communications unit 24 that also is constructed in accordance with this invention. In this particular embodiment, the communications unit 24 is a separate unit. It also is normally in a mode that conveys the signals from the interface 23 through a cable 25 to a telephone 26. Thus, when the operator at the customer site 10 calls the vendor site 22, the telephone 26 rings. When a vendor representative answers the telephone 26, both the operator and the representative can carry on a conversation to discuss the assistance that is required. During this time the communications unit in the terminal 13 and the communication units 24 are in a "voice mode" of operation.

A cable 27 also connects the communications unit 24 to a terminal 30 that includes a CRT display 31 and a keyboard 32. The transfer of information between the keyboard 32 and the display 31 can involve any of the transfer procedures that are described with respect to the terminal 13. If the representative at the vendor site 22 desires to use the data processing system 11, he starts to type commands on the keyboard 32. In response, the communications unit 24 automatically switches to a "data mode" of operation and begins to transmit modulated carrier signals through the interface 23 onto the telephone system 20. The incoming modulated carrier signals at the customer site 10 are coupled through the interface 21 to the communications unit in the terminal 13 to cause this communications unit also to switch to a data mode of operation.

In the data mode, the screens 14 and 31 normally are effectively in parallel and the keyboards 15 and 32 also are effectively in parallel, notwithstanding the specific manner in which data is transferred between a keyboard and display in the terminal. That is, if the terminal 13 normally transfers data directly from the keyboard to the display, the actuation of the keyboard 32 will produce a corresponding display on both displays 14 and 31. Similarly, if the data processing system must echo data from a keyboard to the corresponding display, the use of the keyboard 32 will still produce a corresponding display on both the displays 14 and 31. Thus the customer operator sees, at the customer site 10, what the representative is doing at the vendor site 22. Further, if the vendor representative uses the keyboard 32 to start a test, display data from the test program may be routed from the data processing system 11 over the cable 12 to be displayed on the display device 14 and also may be coupled through the communication unit, the interface 21, the telephone system 20, the interface 23, the communications unit 24, and the cable 27 to the display 31. Thus, both the customer operator and the vendor representative simultaneously see the operations being conducted by the vendor representative and the results of any tests that he runs.

Whenever a data processing operation has been completed and data transmissions have terminated, the communications unit in the terminal 13 and the communications unit 24 both automatically shift back to the voice mode so the customer operator and the vendor representative can discuss the test results without having to make a new telephone call. Assuming that the terminals 13 and 30 both have buffered video or printer displays, they can specifically discuss the data while it is visible.

If the customer operator actuates the keyboard 15, an analogous operation occurs, again depending upon the specific nature of the transfers that occur within the terminal 13. Notwithstanding the specific nature of these transfers, actuation of the keyboard 15 switches the communications unit in the terminal 13 to the data mode and enables the transmission of data signals from the keyboard 15 onto the telephone system 20. Signals transmitted from the communications unit are received by the communications unit 24 thereby causing it to switch to a data mode of operation. Thereafter the operation of the keyboard 15 is reflected in both the display 14 and the display 31. Moreover, if the data processing system 11 transfers data to the display device 14 in response to input data from the customer operator and while the communications units are in the voice mode, they will automatically shift to the data mode so that the information is displayed simultaneously on both the display devices 14 and 31.

At this point in the description, it will be apparent how communications devices constructed in accordance with this invention provide certain of the previously identified objects. Each communications unit interconnects a telephone line, a telephone, and digital data processing equipment. At the customer site, the digital data processing equipment includes the data processing system 11 and the terminal 13. At the vendor site 22 the digital data processing equipment includes the terminal 30. The simultaneous display of information on the display devices 14 and 31 and the response to both the keyboards 15 and 32 coupled with the automatic switchover between data and voice modes facilitates vendor assistance. Specifically the vendor representative at the remote vendor site 22 can communicate with and utilize the data processing equipment at the customer site 10 and still easily discuss operations with the operator. Although the vendor representative has access to the customer's data processing equipment, it is nevertheless under the strict control of the customer; some person at the customer site 10 must intervene by answering or initiating a telephone call through the telephone 16 in order to enable a switchover to the data mode of operation.

B. Specific Description and Operation

Figure 2:
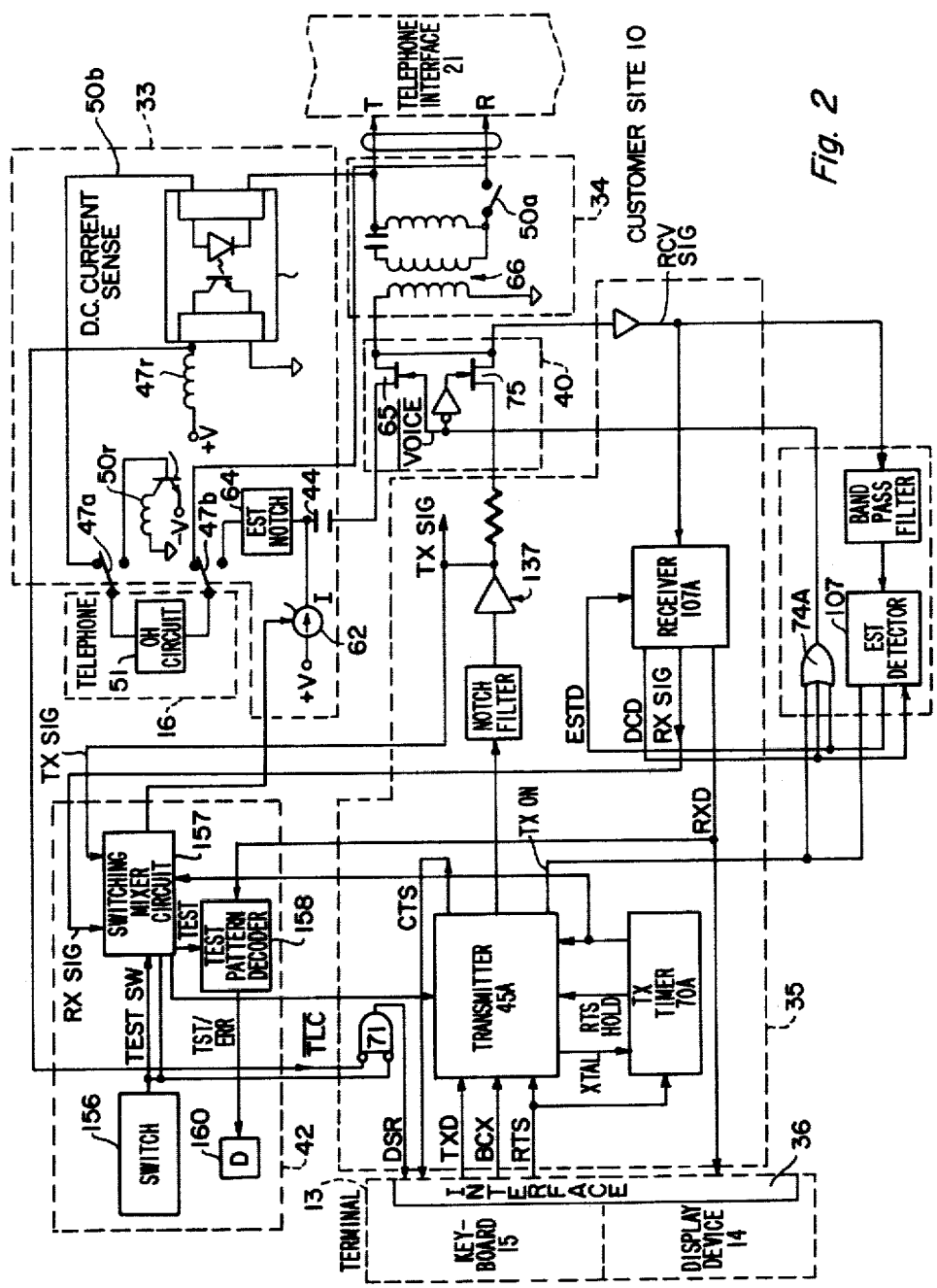
FIG. 2 is a block diagram of a communications unit that is adapted for use in conjunction with a data processing system at a customer site.
Figure 3:
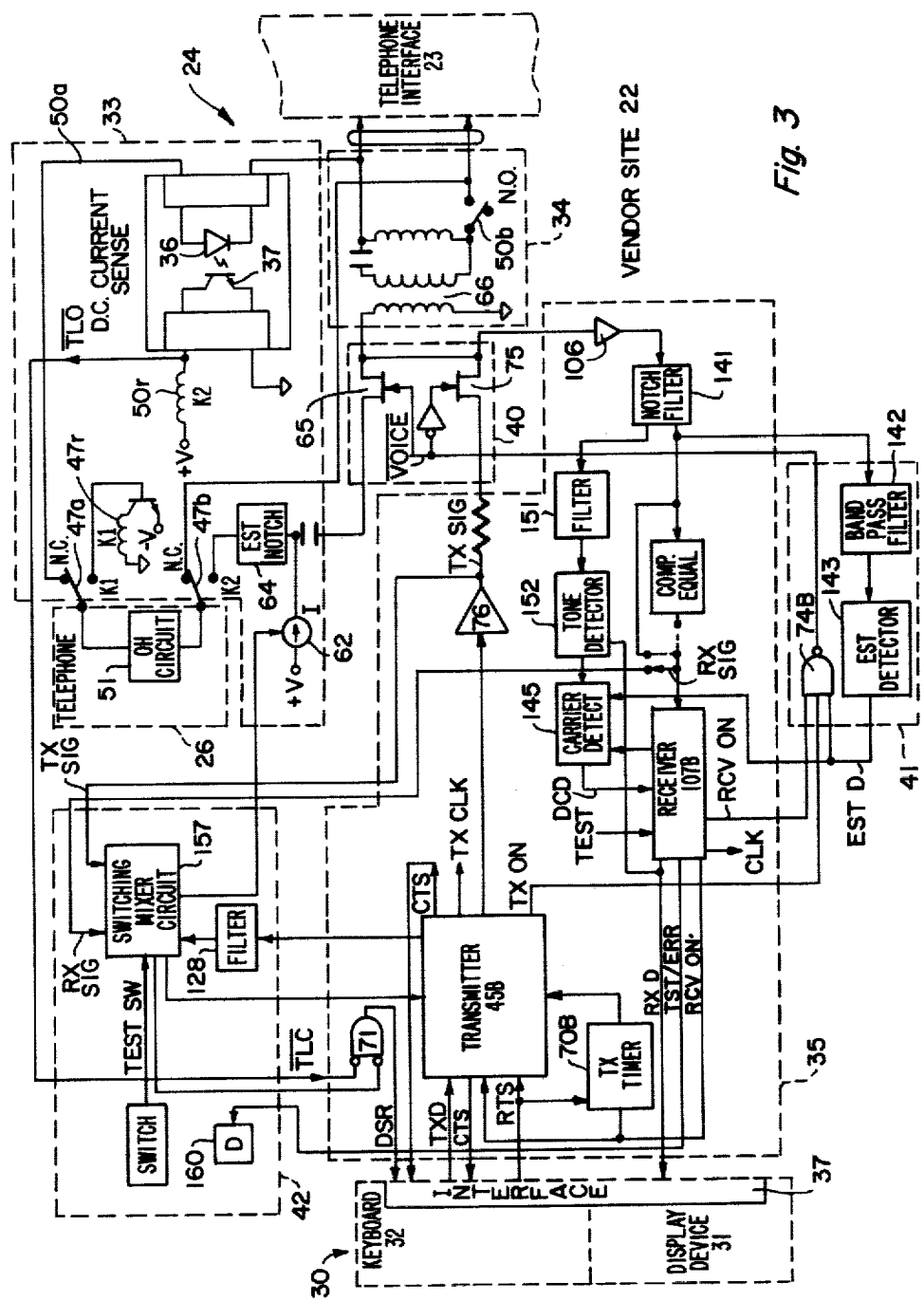
FIG. 3 is a block diagram of a communications unit that is adapted for use in conjunction with data processing equipment at a vendor site that is to communicate with the data processing system at the customer site.
Figure 4:
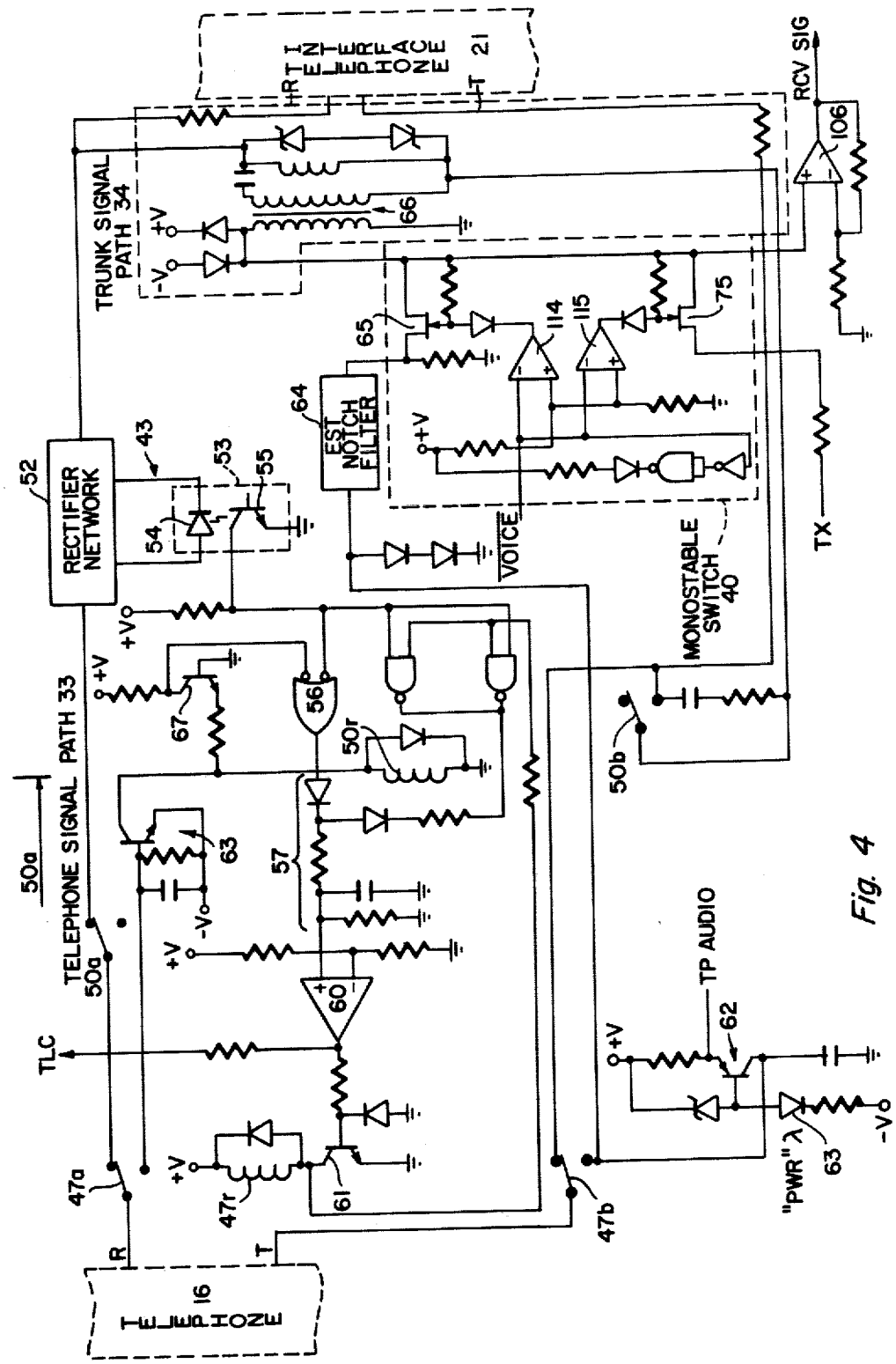
FIG. 4 is a more detailed logic diagram of a telephone signal path, trunk signal path, and monostable switching circuit that are shown in FIG. 2.
Figure 5:
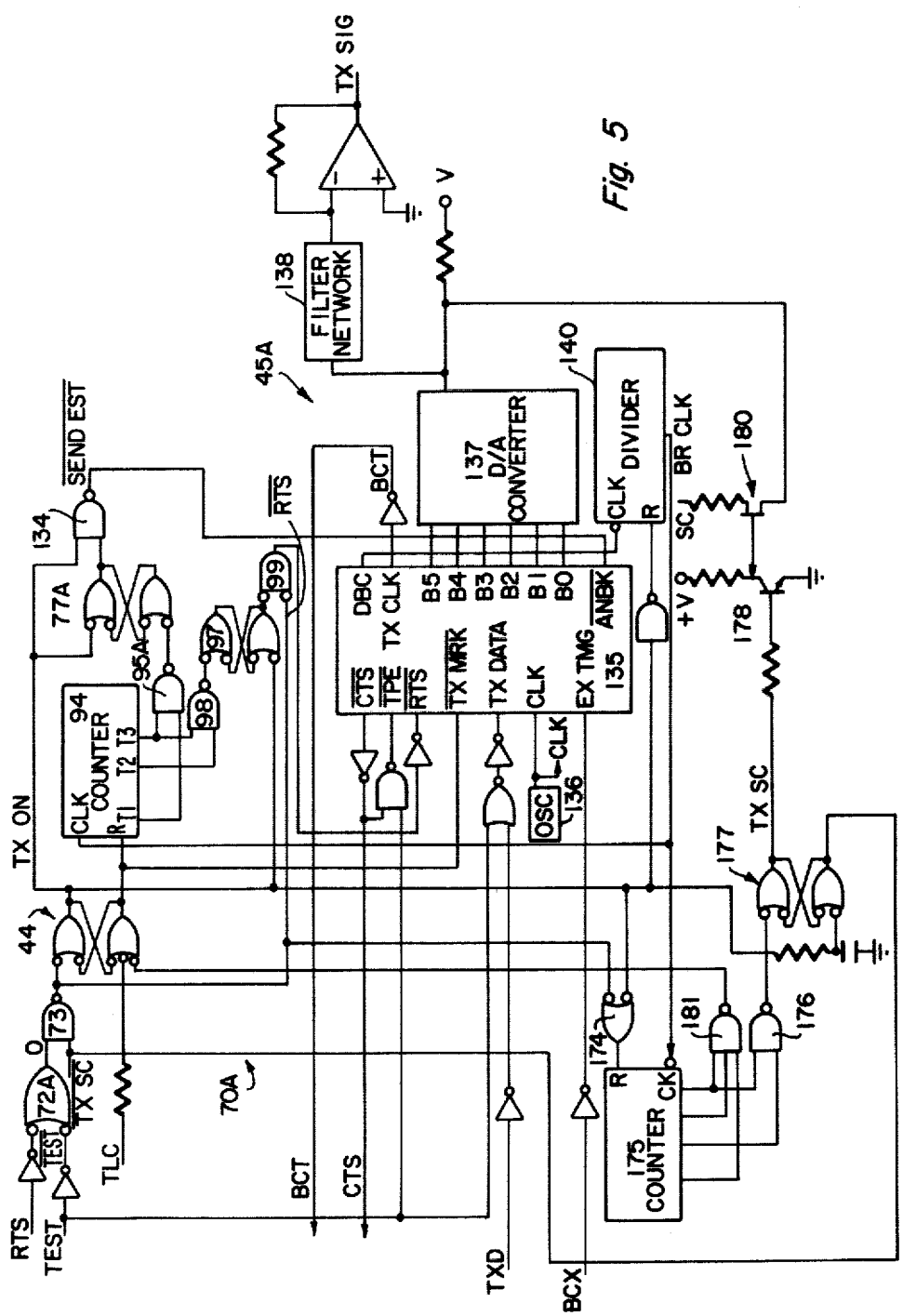
FIG. 5 is a more detailed schematic diagram of a transmitter and timer that are shown in FIG. 2.
Figure 6:
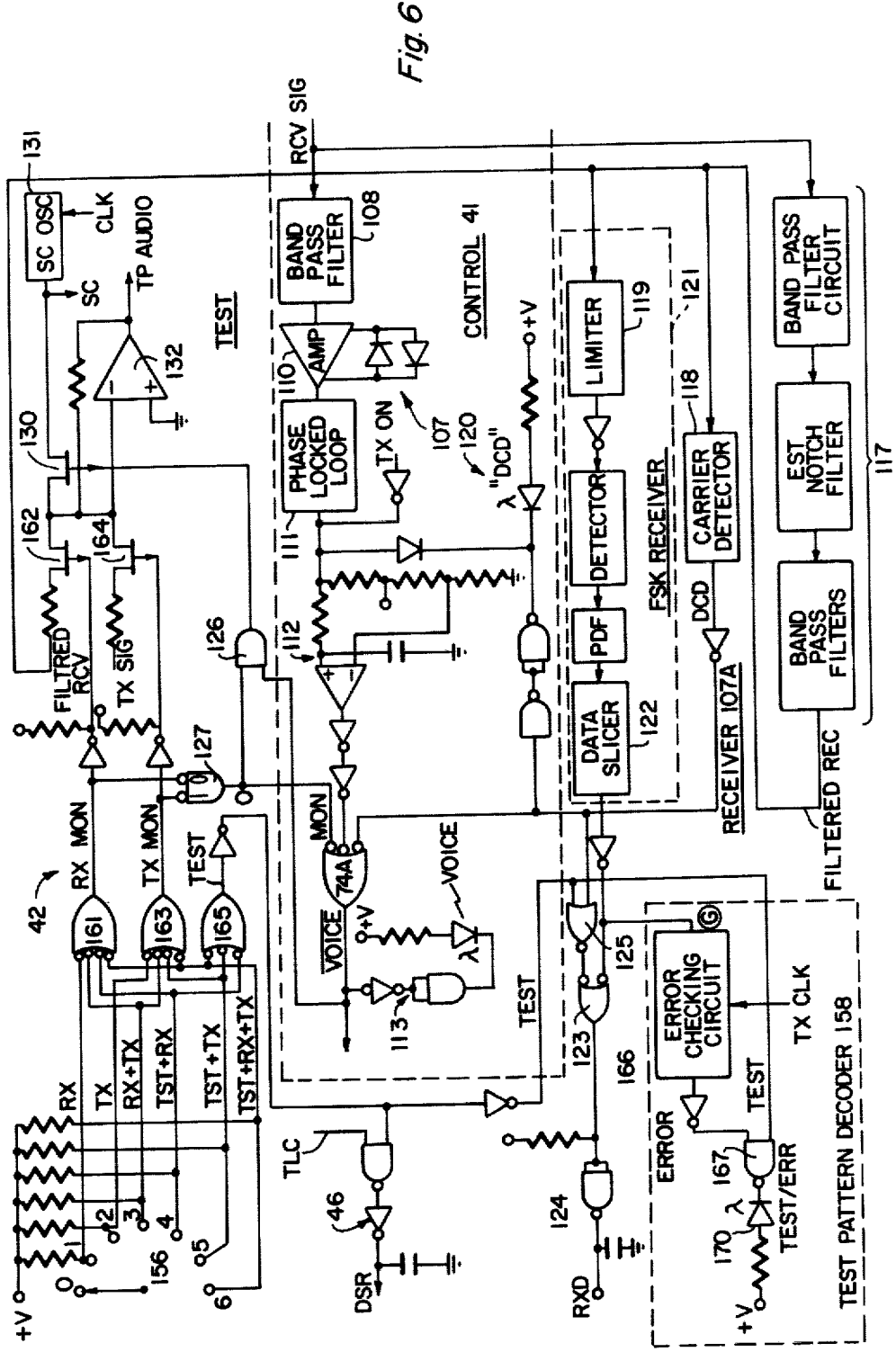
FIG. 6 is a more detailed view of a testing unit, receiver, and control that are shown in FIG 2.
Figure 7:
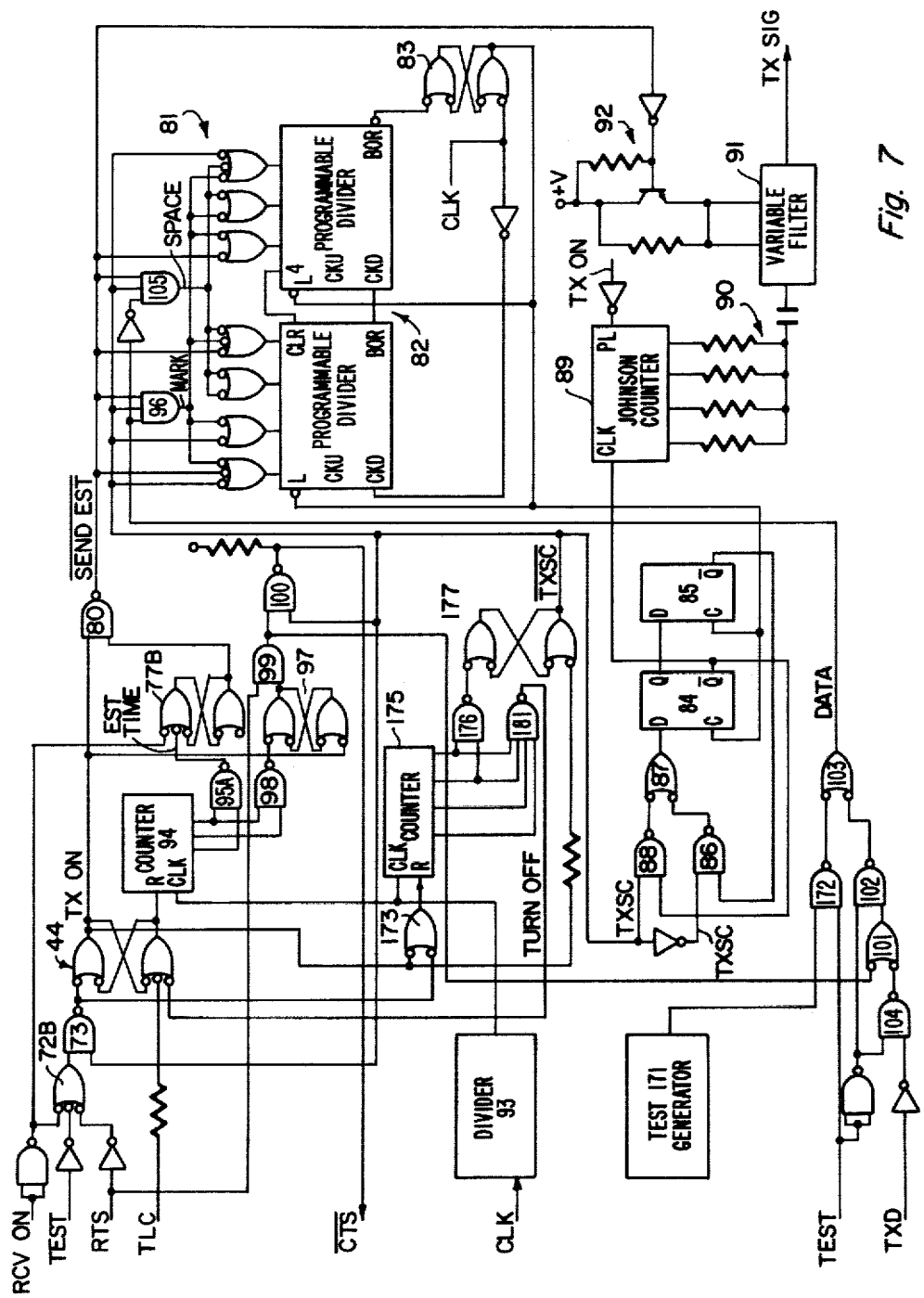
FIG. 7 is a more detailed schematic of a transmitter and timer that are shown in FIG. 3.
Figure 8:
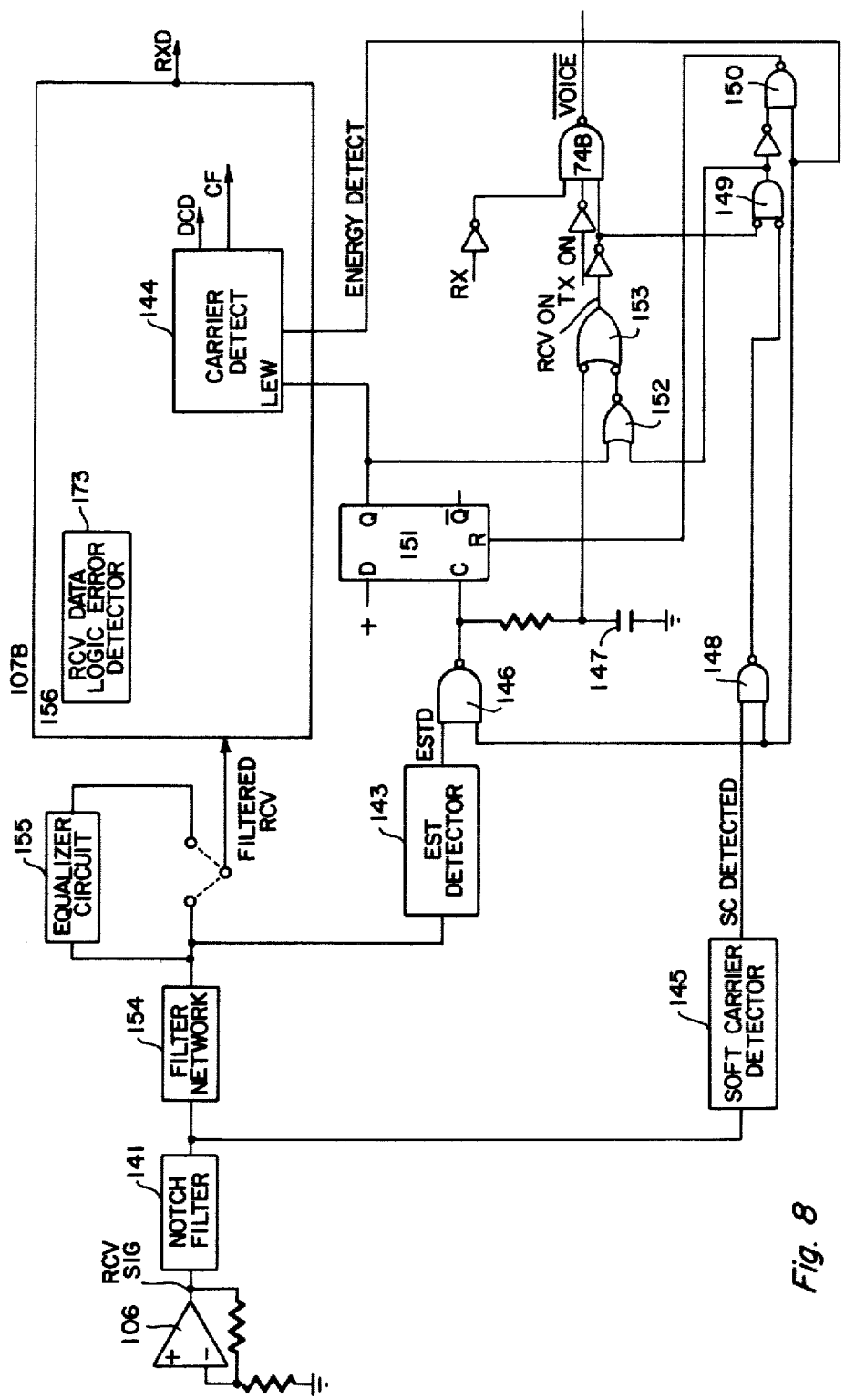
FIG. 8 is a more detailed logic diagram of a control that is shown in FIG. 3.

The communications unit that is located in the terminal 13 is depicted in FIG. 2 and portions of the unit shown in FIG. 2 are depicted in FIGS. 4 through 6. The communications unit 24 is depicted in FIG. 3 and portions of that unit are also depicted in FIGS. 7 and 8. The two units are identical or closely analogous in many respects. The same reference numerals are therefore applied to such identical or closely analogous elements in each of the drawings. Dissimilar reference numerals are applied when the elements differ significantly. At other points the same reference numeral may be utilized with a suffix "A" to identify an element in the communications unit shown in FIGS. 2 and 4 through 6, and a suffix "B" to designate an element in the unit shown in FIGS. 3, 7, and 8.

Now referring to FIGS. 2 and 3, each communications unit includes a telephone signal path 33. The telephone signal path 33 establishes a signal path for signals including voice signals with a telephone: namely, telephone 16 in FIG. 2 and telephone 26 in FIG. 3. A trunk signal path 34 establishes a signal path for telephone signals with a two-wire telephone line through a standard telephone interface: namely, telephone interface 21 in FIG. 2 and telephone interface 23 in FIG. 3. A digital data signal path 35 connects to a terminal interface 36 in FIG. 2 or a terminal interface 37 in FIG. 3 thereby to establish a signal path for digital data signals that are transmitted by and received by digital data processing equipment namely, terminal 13 in FIG. 2 and terminal 30 in FIG. 30. A monostable switching circuit 40 interconnects the telephone signal path 33, the trunk signal path 34, and the digital data signal path 35.

When the monostable switching circuit 40 is in its stable state, it couples signals from the telephone signal path 33 to te trunk signal path 34. This enables normal voice communications to be conducted over the telephone and isolates the digital data signal path 35 from the trunk signal path 34; and the communications unit is considered to be in the voice mode. When the digital data signal path 35 is used, a control circuit 41 responds by switching the monostable switching circuit 40 to its "astable" or "non-stable" state. In this state, the monostable switching circit 40 isolates the telephone signal path 33 from the trunk signal path 34 and connects the digital data signal path 35 to the trunk signal path 34; and the communications unit is considered to be in the data mode. A monitoring circuit 42 in each communications unit enables both the customer operator and the vendor representative to listen selectively through his respective telephone to transmitter and/or receiver analog signals.

Each communications unit assumes several operating modes during use, including the voice and data modes. A typical transfer between different modes is particularly useful in understanding the construction and operation of the communications unit shown in FIGS. 2 and 4 through 6 and the communications unit 24 shown in FIGS. 3, 7, and 8. This sequence includes:

1. An initial idle mode in which the telephone, for example the telephone 16 in FIG. 2, is not in use (i.e., it is on hook);
2. A transition to the voice mode to allow the telephone, for example the telephone 16 in FIG. 2, to be used for voice communications;
3. A transfer to the data mode to allow digital data signals to be coupled between the telephone interface and the digital data signal path 35;
4. A tranfer to test mode to allow the audio representations of the transmitter and receiver signals to be selectively coupled to the telephone and to allow selective testing;
5. A transfer to the voice mode; and
6. A transfer to the idle mode.

1. The Idle Mode

When the communications units are in an idle mode, the telephone 16 in FIG. 2 and telephone 26 in FIG. 3 are not in use. They are, as known, "on hook". As the telephone signal paths 33 in both the communications units are identical, subsequent discussion is directed to the telephone signal path 33 shown in FIG 2, and in more detail in FIG. 4. The telephone signal path 33 includes a DC current sensor 43. When the telephone 16 is not in use, the current sensor 43 is not energized, so a Telephone Line Current (TLC) signal is not asserted. In the drawings an inactive, or nonasserted, signal is indicated by an overscore above the signal designation. When the TLC signal is inactive, it clears a latch 44 that blocks a TX ON signal. The TX ON signal is a transmitter active signal that turns on a transmitter 45A. Thus while the telephone 16 is on hook, the transmitter 45A is turned off.

Referring to FIG. 6, the TLC signal, in its inactive state, blocks the assertion of a Data Set Ready (DSR) signal from a gating circuit 46. The DSR signal is a conventional data communications signal for an input/output terminal. A data processing system will not communicate with a terminal until its DSR signal is asserted.

The telephone signal path 33 in FIG. 2 also includes a relay 47 and a relay 50. A coil 47r in the relay 47 controls a pair of contacts 47a and 47b that are shown in their normally opened positions in FIGS. 2 and 4. The other relay 50 includes a relay coil 50r, a normally opened relay contact 50a in the trunk signal path 34, and a normally closed contact 50b in the telephone signal path 33. FIG. 2 shows the relays as they are positioned in the idle mode. The telephone 16 includes an Off Hook (OH) circuit 51 that essentially is a switch that opens when the telephone handset is on the instrument. The OH circuit 51 therefore interrupts a direct current path from the Tip (T) lead of the telephone interface 21 through the current sensor 43, the normally closed relay contact 50b, and the normally opened relay contacts 47a and 47b to the Ring (R) lead of the telephone interface 21.

2. The Voice Mode

When the customer uses the telephone 16, the OH circuit 51 completes the direct current path and generates an off hook signal. Referring specifically to FIG. 4, the resulting current energizes a rectifier network 52 in the current sensing circuit 43. An optical coupler 53 that includes a light-emitting diode 54 and phototransistor 55 energizes a NOT OR, or NAND, gate 56. After a delay, a coupling network 57 energizes an amplifier 60 that asserts the TLC SIGNAL thereby to indicate the off hook condition of the telephone 16. The amplifier 60 also biases a transistor switch 61 into a conducting state thereby to energize the relay coil 47r. When the relay 47 is energized, contacts 47a and 47b switch and isolate the telephone 16 from the telephone interface 21. The contact 47b connects the telephone to a current source 62 that is energized by a power supply and that also energizes a light-emitting diode indicator circuit 63 to indicate that power is applied to the communications unit.

With the relay 47 energized, a new direct current path runs from the current source 62 through the relay contact 47b, the Tip (T) and Ring (R) leads of the telephone, the contact 47b, a transistor switch 63, and the relay 50r to ground. An alternating current path extends from the Tip (T) lead of the telephone 16 through contact 47b to the input of Echo Suppressor Tone (EST) notch filter 64. The notch filter includes circuitry for isolating direct current from the filter 64. The alternating current path then extends through a normally conductive field effect transistor switch 65 to be impressed across one winding of a coupling transformer 66. The alternating current path from the Ring (R) lead of the telephone 16 includes the transistor switch 63.

The other winding of the coupling transformer 66 connects directly to the Ring (R) of the telephone interface 21 while the Tip (T) lead connects through a path including the relay contact 50b that closes this path when the transistor switch 63 conducts. The transistor switch 63 also closes another transistor switch 67 to energize the NOT OR gate 56 and latch the TLC signal to its asserted state and thereby to latch the relays 47 and 50.

By using the telephone, the customer shifts the communications unit shown in FIG. 2 to the voice mode. The customer then utilizes the telephone 16 to establish communications with the vendor at the vendor site 22 in FIG. 1 by utilizing the dial or touch-tone pad on the telephone 16 in a conventional manner. When the vendor site 22 is rung and the telephone 26 in FIGS. 1 and 3 is answered, the communications unit 24 also shifts to the voice mode. Consequently the customer and representative can carry on a normal conversation. As shown in FIGS. 2 and 3, signals pass from the respective telephones through the telephone signal path 33, the monostable switching circuit 40, and the trunk signal path 34 to the respective telephone interfaces at both the customer site 10 and the vendor site 22. So long as the telephone is off hook and no data is being transmitted, the communications units remain in the voice mode.

3. Data Mode

Either the customer or the vendor representative can initiate a transfer from the voice mode to a data mode of operation. First, initiation by the vendor representative will be discussed. When the vendor representative begins to use the keyboard 32 in FIG. 3, conventional circuits in the interface 37 generate a Request To Send (RTS) signal that the transmitter 45B and a transmitter timer (TX TIMER) circuit 70B receive, provided the Data Set Ready (DSR) signal from a NOT AND, or NOR, gate 71 is asserted.

Referring to FIG. 7, the RTS signal is one of three signals that can energize a NOT OR, or NAND, gate 72B and a NAND gate 73 that is enabled when a TX SC signal is not asserted. Assuming that a TURN OFF signal is not asserted and that the TLC signal is asserted, the energization of the NAND gate 73 by the NOT OR gate 72B sets the latch 44 so the TX ON signal shifts to an asserted state. As described later, the assertion of a TEST signal or an RCV ON signal also will energize the NOT OR gate 72B. An analogous NOT OR gate 72A in FIG. 5 responds only to the assertion of the RTS signal or the TEST signal.

Now referring to FIG. 8, when the TX ON signal is asserted, the VOICE signal from a NAND gate 74B shifts to a nonasserted level. This also occurs with an equivalent NOT OR gate 74A shown in FIG. 6 shown as a logically equivalent OR gate 74A in FIG. 2). In both communications units the effect is the same; when the TX ON signal shifts to an asserted state, the VOICE signal shifts to a nonasserted state.

Now referring to the monostable switching circuit 40 in FIGS. 3 and 4, when the VOICE signal shifts to a nonasserted state, the field effect transistor 65 turns off. Simultaneously, a field effect transistor 75 turns on so that data signals from the transmitter 45B pass through an amplifier 76 as TX SIG signals and then through the coupling transformer 66 for transfer to the telephone interface 23.

In the embodiment shown in FIG. 7, the TX ON signal, when asserted, initiates a predetermined preamble to any data transfer that includes a fixed interval of an echo suppressor tone followed by a fixed interval of synchronizing marks. Specifically, the assertion of the TX ON signal removes an overriding clearing signal from a latch 77B. However the latch 77B remains cleared and, with the assertion of the TX ON signal, a NAND gate 80 asserts a SEND EST signal. This signal is received by a gating network 81 that controls an initial timing value loaded into programmable dividers 82.

High frequency CLK pulses from the digital data signal path 35 are applied to a CKD input of one of two cascaded programmable dividers 82. A Borrow (BOR) output signal, when asserted, sets a latch 83 until a next CLK pulse clears the latch and reloads the divider 82. The gating network 81, the programmable dividers 82, and the latch 83 thus constitute an oscillator whose frequencies are varied according to the number from the gating network 81 that is loaded into the programmable dividers 82. This frequency is the rate at which the latch 83 cycles between its two states. The pulses from the latch 83 are also coupled to another programmable divider including flip-flops 84 and 85 and input gates 86, 87, and 88. The gates 84 and 85 produce a clocking input to a Johnson counter 89 every second or fourth pulse from the latch 83, depending on the state of the TX SC signal. Specifically, if the TX SC signal is asserted, the NAND gate 86 and NOT OR gate 87 couple the output of the flip-flop 85 to the input of the flip-flop 84, thereby to divide the signals by four. When the TX SC signal is not active, the incoming pulses are divided by two.

The Johnson counter 89 is set to a predetermined initial number while the TX ON signal is not asserted. When the TX ON signal shifts to an asserted state, the Johnson counter 89 advances in response to its clocking input and produces a series of outputs across a weighted resistive network 90. The resistive network 90 connects to a summing point, so the rate at which the Johnson counter 89 cycles determines the frequency of a sine wave output signal from a variable band pass filter 91. This output signal is the TX SIG signal that is coupled through the field effect transistor 75 of FIG. 3. When the SEND EST signal is asserted, an amplifier 92 changes the center frequency of the variable filter 91 to adapt it for the echo suppressor tone.

Still referring to FIG. 7, the echo suppressor tone continues for a predetermined time inteval determined by a divider 93 and a counter 94. After the predetermined interval, the counter energizes a NAND gate 95A to set the latch 77B and terminate the SEND EST signal.

At this time, the input signals condition a NAND gate 96 in the gating network 81 that establishes a MARK timing so a MARK frequency is transmitted onto the TX SIG line through the variable filter 91. The variable filter will have reverted to its original value as a result of the action of the amplifier 92. The MARK signals synchronize the receiver and continue until a latch 97, that is cleared when the TX ON signal is not asserted, is set by a NAND gate 98 that connects to the counter 94. An AND gate 99 energizes a NAND gate 100 that is enabled when the TX SC signal is not asserted, thereby to generate a Clear To Send (CTS) signal that is returned to the interface 37 in FIG. 3 to enable the terminal 30 to begin trnasferring data over a TXD line.

Thus, when the vendor representative begins operations, the transmitter 45B and TX TIMER 70B in FIG. 3 cause a first period of echo suppressor tone to be transmitted onto the telephone interface 23 followed by a predetermined interval of synchronizing MARK signals.

Once the synchronizing interval has been completed, the output from the AND gate 99 deenergizes a NOT OR gate 101. The gate 101 couples the MARK data signal through a NAND gate 102, that is enabled when a TEST signal is not asserted, and a NOR OR gate 103. The data (TXD) signals from the interface 37 in FIG. 3 are then coupled through a NAND gate 104 that is enabled when the TEST signal is inactive and the NOT OR gate 101, NAND gate 102, and NOT OR gate 103. When this occurs, the alternating state of the DATA signal energizes the AND gate 96 and an AND gate 105 to condition the programmable divider 82 to generate a mark frequency when the AND 96 is energized and a space frequency when the AND gate 105 is energized.

Now referring to FIGS. 2 and 4 through 6, the incoming signals from the telephone interface 21 in FIGS. 2 and 4 pass through the trunk signal path 34. From the coupling transformer 66 they pass through an amplifier 106 as RCV SIG signals. The EST notch filter 64 blocks the transmission of the echo suppressor tone to the telephone 16. Referring to FIG. 6, the RCV SIG signals pass to a receiver 107A. The center frequency of a band pass filter 108 corresponds to the frequency of the echo suppressor tone. A gain limited amplifier 110 drives a phase locked loop 111 which, when it detects the presence of the echo suppressor tone, conditions an amplifier 112 to force the VOICE signal from the NOT OR gate 74A to a nonasserted level. When this occurs, a light-emitting diode indicator circuit 113 is deenergized thereby to visually indicate the shift to the data mode of operation.

Referring to FIG. 4, amplifiers 114 and 115 in the monostable switching circuit 40 are conditioned so the amplifier 114 shifts the field effect transistor 65 to a nonconducting state and shifts a field effect transistor 75 to a conducting state. This condition of the monostable switch 40 is an astable state and is maintained so long as the VOICE signal is not asserted.

Referring again to FIG. 6, the RCV SIG signals also pass through a filtering network 117 in the receiver 107A to produce FILTERED REC signals that are coupled in parallel to a carrier detector circuit 118 and a limiter 119. When the carrier detector circuit 118 detects a carrier signal, it asserts a Data Carrier Detected (DCD) signal that is coupled to the NOT OR gate 74A to provide a second energizing input that continues so long as an incoming carrier is present. The DCD signal also controls the VOICE signal and the illumination of a DCD indicator circuit 120.

The limiter 119 is a first input of a standard FSK receiver 121 that includes a detector, post detection filters, and a data slicer 122. These are all conventional elements and, as known, signals from the data slicer 122 corespond to the received data. A NOR OR gate 123 and a driver 124 couple this data from the data slicer 122 as RXD signals that are conveyed to the interface 36 in FIG. 2. A NOR gate 125 also will generate the RXD signal when a test is in progress or when the DCD signal is not asserted, thus to block any data on the RXD lead.

During normal operations in the data mode, an AND gate 126 is enabled by a NOT AND gate 127 so long as the monitoring circuit 42 is not active. When the VOICE signal is not asserted, the AND gate 126 energizes a field effect transistor 130 thereby to switch the output of a tone oscillator, in this unit a soft carrier oscillator 131, driven by the CLK pulses, to an amplifier 132. This produces a TP AUDIO signal which, as shown in FIG. 4, modulates the current source 62. As a result, the oscillator output signal is transmitted through the current source 62 and produces a tone in the telephone 16. Thus, so long as the communications unit is in the data mode, the customer hears a steady tone in the earpiece of the telephone 16. This is a positive indication that the communications unit is in the data mode. The same switching of a tone from the transmitter 45B and a filter 128 occurs at the vendor site 22 (FIG. 3).

Once the communications units are in the data mode, data can be transmitted from the vendor site 22 in FIG.

1 to the customer site 10. As the transmissions normally will be generated by the keyboard 32 in FIG. 3, the data rate is very slow. For that reason, the communications unit 24 contains the transmitter shown in FIG. 7 that operates at a slow rate (e.g., 150 baud) and in a frequency shift keyed mode. On the other hand, the data processing equipment at the customer site represented by the terminal 13 in FIG. 2 can transmit data at a much higher rate. For that reason, the communications unit shown in FIG. 2 includes a transmitter, such as a phase shift keyed transmitter 45A that is capable of transmitting data at a higher speed (e.g., 2400 baud).

Referring to FIGS. 2 and 5, transmissions from the customer site 10 in FIG. 1 are initiated when the interface 36 in FIG. 2 generates an RTS signal that the transmitter 45A and the timer 70A receive. As previously described with respect to the communications unit in FIG. 3, the latch 44 sets and generates the TX ON signal. This energizes a NAND gate 134 that asserts the SEND EST signal. The SEND EST signal is applied to the ANBK input of a conventional phase shift keyed transmitter 135. BCX timing signals from the interface 36 in FIG. 2 are applied to an EX TMG input to synchronize BCT signals from the transmitter 135 with the BCX signals. The transmitter 125 can also generate the BCT signals in response to CLK signals from an external oscillator 136. The NOT AND gate 99 also connects to an RTS input.

Under these conditions the transmitter 135 produces a sequence of digital outputs at B0 through B5 outputs that a digital-to-analog converter 137 converts into an echo suppressor tone that passes through a filter network 138 as TX SIG signals. The transmitter 45A continues to generate the echo suppressor tone until a counter 94 in the TX TIMER 70A energizes a NAND gate 95A that resets the latch 77A and terminates the SEND EST signal. Assuming that the TXD signal is inactive, because the CTS signal is not asserted and disables the terminal 13, the transmitter 135 begins to send a MARK frequency for synchronizing the receiver at the vendor site. This continues until the NAND gate 98 sets the latch 97 whereupon the NOT AND gate 99 generates a signal that is coupled to the RTS input of the transmitter 135. This signal causes the transmitter 135 to generate the CTS signal thereby to enable the initiation of data transmissions over the TXD line. The signal at the RTS input also conditions the transmitter 135 to produce outputs correponding to the data signals at a TX DATA input thereby to generate phase shift keyed signals onto the TX SIG line.

A DBC clocking signal is applied to a divider 140 in FIG. 5 that the TX ON signal enables. BR CLK pulses are generated for various purposes, including advancing the counter 97.

Summarizing the operation of the transmitter 45B and TX TIMER 70B shown in FIG. 3 and in more detail in FIG. 5, incoming data at a high baud rate (2400 baud in this specific embodiment) appears in digital form on the TXD line. The transmitter 135 converts these signals into a sqeuence of output signals corresponding to a phase shift keyed waveform which a D/A converter 137 then converts to an analog form. A filter network 138 produces the final analog TX SIG signals that are coupled through the field effect transistor 75 in FIG. 2, the trunk signal path 34 and the telephone interface 21.

Referring to FIG. 3, the incoming phase shift keyed data signals are received from the telephone interface 23 and pass through the trunk signal path 34. An amplifier 106 couples these signals through a notch filter 141 which attenuates signals from the transmitter 45B to protect the receiver 107B. The initial echo suppressor tone passes through a band pass filter 142 to an echo suppressor tone (EST) detector 143.

Referring to FIG. 8, the EST detector 143 asserts an ESTD signal when it detects an echo suppressor tone. This tone controls a gating network that in turn controls the state of the VOICE signal. There are two other inputs to this circuit. One is an ENERGY DETECT signal from a carrier detect circuit 144 in the receiver and the other is an SC DETECTED signal from a soft carrier detector 145. Initially the ESTD, ENERGY DETECT, and SC DETECTED signals are all at nonasserted levels. Thus the output from a NAND gate 146 is at a high level and charges a capacitor 147. Another NAND gate 148 disables a NOT AND gate 149, as in this state a NAND gate 150 applies an overriding reset signal to a flip-flop 151. Clearing the flip-flop 151 disables timing circuits in the carrier detect circuit 144 that generate the DCD signal after the energy detect signal is asserted for a predetermined interval. In addition, the NOT AND gate 149 and flip-flop 151 condition a NOR gate 152 and a NOT OR gate 153 that also receives the output signal from the capacitor 147 so the RCV ON on signal is at a nonasserted level.

When the incoming echo suppressor tone begins, the carrier detect circuit 144 will shift the ENERGY DETECT signal to an asserted state. The EST detector circuit 143 also will shift the ESTD signal to an asserted state. When the ENERGY DETECT signal is asserted, the NAND gate 150 removes the overriding resetting signal to the flip-flop 151. The NAND gate 146 is also energized, and the capacitor 147 discharges. After a short time interval, the signal from the capacitor 147 energizes the NOT OR gate 153 and the RCV ON signal is asserted. The NAND gate 74B responds by shifting the VOICE signal to its nonasserted state. When the ESTD signal shifts back to its nonasserted state, the NAND gate 146 clocks the flip-flop 151. The flip-flop 151, when set, energizes the NOR gate 152 so the RCV ON signal remains asserted. The flip-flop 151 also enables the carrier detect circuit 144 to monitor the ENERGY DETECT signal and assert the DCD signal and the CF signal. Thus, the VOICE signal remains at its nonasserted level so long as the carrier detect circuit 144 continues to detect energy.

The RCV SIG signals from the amplifier 106 can then pass through a filter network 154 and an optional equalizer circuit 155 to provide FILTERED RCV signals that are applied to a conventional demodulating and decoding circuit 156. One such decoding circuit is disclosed in U.S. Pat. No. 3,818,347 issued June 18, 1974, and titled, "Receiver for Amplitude Modulated Quadrature Carrier Signals", which patent is assigned to the same assignee as the present invention. The resulting RXD signals from the receiver 146 are then coupled to the interface 37 shown in FIG. 3 to provide a display of the information on the display device 31.

From the foregoing discussion, it will be apparent that while the communications units shown in FIGS. 2 and 3 operate in the data mode, the keyboards 15 and 32 normally are in parallel. That is, if either the customer operator uses the keyboard 15 or the vendor representative uses the keyboard 32, a display appears on both displays 14 and 31. Similarly, any data from the data processing system that is to be displayed on the display device 14 will also be displayed on the display device 31. Again, this effective parallel connection of the keyboards and displays exists notwithstanding the specific nature of the transfers that occur between the keyboard and display in a terminal. Stated differently, the communications units are independent of the specific construction of the terminals to which they attach. As a result, when either the customer operator or the vendor representative utilizes the system, both see what is occurring simultaneously.

4. The Testing Mode

The testing circuit 42 in FIGS. 2 and 3 allows the customer and the representative to monitor the TX SIG and RX SIG signals. These are analog signals that are found in the digital data signal paths. Each operator controls the testing circuit 42 by means of a switch 156. A switching-mixer circuit 157 responds to the switch 156 by selectively coupling one of the TX SIG or RX SIG signals to the current source 62, thereby to modulate it. As a result, the selected signal is heard in the telephone. The circuit 157 also generates the TEST signal. In FIG. 2, the TEST signal is applied to a test pattern decoder circuit 158 that then controls the energization of a detector 160 which can comprise a light-emitting diode. In the communications unit shown in FIG. 3, the receiver 107B responds to the TEST signal and includes error circuitry for generating TST/ERR signals that are coupled to a display 160.

The circuit specifically used in the communications unit of FIG. 2 appears in more detail in FIG. 6. The switch 156 comprises a single-pole multiple-position switch. In the depicted position of the switch 156, no monitoring or testing operations occur. When the switch is on position 1, 3, 4, or 6, a NOT OR gate 161 generates an RX MON signal. This turns on a field effect transistor 162 and couples the FILTERED RCV signals to the amplifier 132. These signals produce the TP AUDIO signal and modulate the current source 62 in FIG. 2. If the switch 156 is at positions 2, 4, or 6, a NOT OR gate 163 asserts a TX MON signal that turns on a field effect transistor 164 to couple the TX SIG signals to the amplifier 132. Whenever either of the NOT OR gates 161 or 163 is energized, the NOT AND gate 127 causes the NOT OR gate 74A to shift the VOICE signal to a nonasserted level. The AND gate 126 is then conditioned to turn off the field effect transistor 130 and isolate the SC oscillator 131 so that only the selected signals modulate the current source 62.

If the switch 156 is moved to positions 4, 5, or 6, a NOT OR gate 165 asserts the TEST signal. Referring to FIGS. 2 and 5, the TEST signal, when asserted, energizes the gate 72A and sets the latch 44, thereby to turn on the transmitter. It also provides the appropriate data for the TX DATA input of the phase shift encoder 135. In FIG. 6, the TEST signal disables the DSR signal from the gating network 47 so no further communications will occur between the interface 36 and the communications unit. The TEST signal also enables a test pattern decoder that includes an error checking circuit 166 that receives the RXD signals from the receiver 107A. Each time an error occurs, the error checking circuit energizes a NAND gate 167 that controls a light-emitting diode 170 in order to display the errors.

Referring to FIGS. 3 and 7, the TEST signal enables a NAND gate 172 to couple signals from a test generator 171 through the NOT OR gate 103 thereby to control the programmable dividers 82 and transmit a pseudo-random test pattern to the customer communications device shown in FIG. 2. This is the incoming signal that is monitored by the test pattern decoder 158. The signals from the transmitter 45A in FIG. 2 are decoded in the error detection circuitry of the receiver 107B as set forth in FIG. 3 and shown in FIG. 8 as receive data logic error detector 173. Thus it is possible for the customer and the vendor representative to test the operation of the communications device and the communications lines to ascertain the existence of any errors. The difference in the two frequencies of the transmitters facilitates this testing because it allows full duplex communications to occur. By full duplex communications, we mean a method of operation wherein each end can simultaneously transmit and receive.

5. Voice Mode

The shift from the data mode of operation back to voice mode is accomplished in basically the same way in both communications units. Referring to FIGS. 2 and 5, when no additional data is to be transmitted, the RTS signal shifts to a nonasserted level. This removes a signal from the latch 44. However, the latch 44 continues to assert the TX ON signal. The shift of the RTS signal to its nonasserted state deenergizes the AND gate 99 and removes an overriding resetting signal from a counter 174. Pulses from the divider 140 then advance a counter 175 until a NAND gate 176 sets a latch 177 that generates a TX SC signal. This turns on an amplifier 178 and allows a field effect transistor 180 to couple the soft carrier (SC) signals from the SC oscillator 131 in FIG. 6 to the output of the D/A converter 137. The filter network 138 then couples the soft carrier signal to the TX SIG signal line and through the field effect transistor 115 and trunk signal path 34. The soft carrier continues to be generated onto the telephone lines until a NAND gate 181 is energized. When this occurs, the latch 44 is cleared and the TX ON signal terminates so the transmitter 45A turns off. An analogous operation occurs in the communications unit shown in FIG. 3. In this case, however, setting the latch 177 conditions the gating network 81 to transmit the soft carrier tone through the variable filter 92.

When the soft carrier tone is received at the communications unit shown in FIGS. 2 and 6, it continues to be detected in the phase lock loop and in the carrier detector circuit 118. When the soft carrier tone terminates, assuming that the TX ON signal is at a nonasserted level, the integrating amplifier 112 then conditions the NOT OR gate 74A to assert the VOICE signal.

Referring to the communications unit in FIGS. 3 and 8, the soft carrier detector 145 detects the soft carrier tone and asserts the SC DETECTED signal and causes the NAND gate 148 to energize the NOT AND gate 149. The RCV ON signal therefore continues to be asserted through the NOR gate 152 and NOT OR gate 153. The NAND gate 150, however, clears the flip-flop 151 and disables the carrier detection circuit 144. When the soft carrier tone subsequently terminates, the SC DETECTED signal shifts to a nonasserted level and the RCV ON signal terminates. Again assuming that the TX ON signal and RX signals are both at a nonasserted level, the NAND gate 74B asserts the VOICE signal.

When this occurs, the field effect transistor 130 in FIG. 6 disconnects the SC oscillator 131 from the amplifier 132. A corresponding field effect transistor in the switching mixer circuit 157 in FIG. 3 disconnects the amplifier 132 from the filter 128. Consequently both parties hear the tone disappear in their respective headsets. This is their indication that the communications units are now in the voice mode. They then can carry on a telephone conversation to discuss the results of any testing or operations that have been performed while the communications units have been in the data mode. As will also be apparent, additional tests can then be run and, without additional dialing, the communications units can be shifted between the data and voice modes as often as necessary.

6. The Idle State

Referring now to FIGS. 2, 3, and in particular to FIG. 4, when the parties hang up, the OH circuit 51 breaks the DC path from the current source 62. Relay coils 47r and 50r are deenergized. Their respective contacts then shift to the depicted positions so the original idle state exists wherein the telephones 16 and 26 are connected directly to the Tip (T) and Ring (R) leads of the telephone interface 21.

C. Summary

There has been disclosed an apparatus for enabling a customer at a customer site and a vendor representative at a remote vendor site to utilize data processing equipment at the customer site simultaneously, but under the explicit control of the customer. The two disclosed embodiments enable full duplex communications over a telephone line. Specific transmission frequencies and encoding, modulating, demodulating, and decoding techniques have been disclosed. These embodiments operate with a certain protocol for transmission, including the initial transmission of an echo suppressor tone and a transmission interval of mark frequencies as a preamble to any data transmission, and the atransmission of a soft carrier signal as a postamble to such a transmission.

The two disclosed embodiments are primarily related to communication units that allow data and voice communications to be achieved over telephone lines and specifically over a single telephone line. The capabilities of the disclosed communications units facilitate vendor assistance to a customer because both the customer and vendor representative view the operation of the customer's data processing system simultaneously and then, merely by terminating data communication, can discuss their observations over the same telephone. Requirements for second telephone connections are obviated.

While all the foregoing and other objects and advantages can be achieved with the specific structure and operation that is disclosed, it will be apparent to those of ordinary skill in the art that many modifications can be made to the specifically disclosed apparatus while still achieving some or all of the foregoing objects and advantages. Therefore, it is the object of the appended claims to cover all such variations and modifications as come within the true spirit and scope of this invention.

What is claimed as new and desired to be secured by Letters Patent of the United States is:

1. A communications unit that interconnects to telephone, telephone line, and digital data processing equipment, said communications unit comprising:
   A. telephone signal path means for establishing a signal path with the telephone for voice signals;
   B. trunk signal path means for establishing a signal path with the telephone line for telephone line signals;
   C. digital data signal path means for establishing a signal path with the digital data processing equipment for digital data signals;
   D. monostable switching means for interconnecting said telephone signal path means and said trunk signal path means in its stable state and for interconnecting said digital data signal path means and said trunk signal path means in its a stable state; and
   E. control means connected to said digital data signal path means and said monostable switching means for establishing the astable state of said switching means in response to use of said digital data signal path means.

2. A communications unit as recited in claim 1 wherein said digital data signal path means includes digital data transmitting means and means for generating a transmitter active signal when said transmitter is in use, said control means being responsive to the transmitter active signal for switching said monostable switching means to its astable state.

3. A communications unit as recited in claim 2 wherein said digital data signal path means includes digital data receiving means and means for generating a receiver active signal when said receiving means is in use, said control means being responsive to the receiver active signal for switching said monostable switching means to its stable state.

4. A communications unit as recited in claim 3 wherein said transmitting means includes means for generating a tone at a predetermined frequency each time said transmitting means becomes active and said receiver active signal generating means includes means responsive to the receipt of the tone for a predetermined time interval for generating the receiver active signal.

5. A communications unit as recited in claim 4 wherein said telephone signal path means includes notch filter means for blocking signals of the predetermined frequency thereby to block the tone from the telephone.

6. A communications unit as recited in claim 3 wherein said receiving means includes means for receiving a modulated carrier signal from said trunk signal means through said monostable switching means and means for detecting the receipt of the carrier signal and wherein, said receiver active generating means includes means responsive to the detection of the carrier by said carrier detection means for generating the receiver active signal.

7. A communications unit as recited in claim 2 additionally comprising oscillator means for generating a tone signal, said monostable switching means including tone switching means for coupling the tone signal to said telephone signal path means thereby to convey the tone signal to the telephone as an audible tone when the said monostable switching means is in its astable state.

8. A communications unit as recited in claim 7 additionally comprising monitoring means connected to said data signal path means for monitoring receiver and transmitter analog signals corresponding to received and transmitted digital data signals, selection means connected to said monitoring means for selectively coupling the analog signals to said monitoring means, and means connected to said selection means for disabling said tone switching means thereby to block the tone to the telephone when said monostable switching means is in its astable state and said selection means activates said monitoring means.

9. A communications unit as recited in claim 8 wherein said transmitter means includes means connected to said tone generator means for coupling the tone signal through said monostable switching means and said trunk signal means as a soft carrier signal for a predetermined time interval at the end of each data transmission and means for establishing a predetermined data signal when the soft carrier signal is being transmitted.

10. A communications unit as recited in claim 2 wherein said transmitter means includes means for generating a soft carrier signal for a predetermined time interval at the end of each data transmission, means for coupling the soft carrier signal through said monostable switching means and said trunk signal means during the predetermined interval, and means for establishing a predetermined data signal when the soft carrier signal is being transmitted.

11. A communications unit as recited in claim 1 wherein said digital data signal path means includes digital data receiving means and means for generating a receiver active signal when said receiving means is in use, said control means being responsive to the receiver active signal for switching said monostable switching means to its astable state.

12. A communications unit as recited in claim 11 wherein said digital data signal path means includes a transmitting means for transmitting a signal, and means for generating a tone at a predetermined frequency each time said transmitting means become active, said receiver active signal generating means including means responsive to the receipt of the tone from said trunk signal path lines for a predetermined time interval for generating the receiver active signal.

13. A communications unit as recited in claim 12 wherein said receiving means includes means for receiving a modulated carrier signal from said trunk signal means through said monostable switching means and means for detecting the receipt of the carrier signal and wherein said receiver active generating means includes means responsive to the detection of the carrier by said carrier detection means for generating the receiver active signal.

14. A communications unit as recited in claim 11 wherein said digital data signal path means includes transmitter means for generating a soft carrier signal for a predetermined time interval at the end of each data transmission, means for coupling the soft carrier signal through said monostable switching means and said trunk signal means during the predetermined interval, and means for establishing a predetermined data signal when the soft carrier signal is being transmitted and wherein said receiver active generating means includes means responsive to the detection of the soft carrier signal for generating the receiver active signal.

15. A communications unit as recited in claim 1 wherein said digital data signal path means includes a digital data transmitting means for modulating a first carrier signal in response to digital data to be transmitted onto the telephone line and receiving means connected to said monostable switching means for demodulating modulated signals on a second carrier signal received from the telephone line through said monostable switching means.

16. A communications unit as recited in claim 15 wherein each of said transmitting and receiving means includes a clocking circuit for defining different frequencies for the first and second carrier signals.

17. A communications unit as recited in claim 16 wherein said transmitting means includes means for frequency shift keying digital data signals and said receiving means includes means for demodulating phase shift keyed digital data signals.

18. A communications unit as recited in claim 16 wherein said receiving means includes means for demodulating frequency shift keyed digital data signals and said transmitting means includes means for generating phase shift keyed digital data signals.

19. A communications unit as recited in claim 16 wherein said receiving means and transmitting means are connected in parallel to said monostable switching means thereby to establish a full duplex path through said trunk signal path means.

20. A communications unit as recited in claim 1 additionally comprising monitoring means connected to said telephone signal path means and said digital data signal path means for energizing said telephone signal path means in response to signals in said data signal path means and selection means for selectively operating said monitoring means, said selection means being connected to said control means for causing said control means to shift said monostable switching means to its astable when said monitoring means is in use.

21. A communications unit as recited in claim 20 wherein said telephone signal path means includes a current source means for energizing the telephone and said monitoring means includes means for modulating said current source means thereby to energize said telephone signal path means in response to the signals in said data signal path means.

22. A communications unit as recited in claim 21 wherein said digital data path means includes transmitting means for transmitting modulated digital data carrier signals and receiver means for demodulating received digital data carrier signals and said current source modulating means includes switch means connected to said selection means for selectively coupling signals from one of said transmitting and receiving means to said current source modulating means.

23. A communications unit as recited in claim 22 wherein said communications unit additionally includes signal testing means connected to said digital data signal path means for testing the data therethrough.

24. A communications unit as recited in claim 23 wherein said signal testing means includes test code generating means connected to said modulated carrier signal transmitting means for providing test data to said transmitting means.

25. A communications unit as recited in claim 23 wherein said signal testing means includes means connected to said receiving means for decoding test data and means for indicating errors in the decoded test data.

26. A communications unit as recited in claim 1 wherein said trunk signal path means has a first connection for the telephone and a second connection to said monostable switching means and the telephone includes means for generating an offhook signal when a handset is removed therefrom, said telephone signal path means including current sensing means connected to the telephone for detecting the offhook signal, first switching means for disconnecting the telephone signal path means from a direct connection through the trunk signal path means to the telephone lines, a current source means for generating direct current, and second switching means responsive to said current sensing means and said disconnecting means for switching the telephone signal path means to said second connection of said trunk signal path means and to said current source means.

27. A communications unit as recited in claim 26 wherein said current sensing means includes means for generating a telephone control signal in response to the offhook signal, said digital data signal path means including enabling means for responding to the telephone control signal and means for generating a status signal for the digital data processing system in response to the telephone control signal.

28. A communications unit as recited in claim 1 wherein said trunk signal path means includes transformer means having a first winding connected to said monostable switching means and a second winding having one connection for the telephone line and switch means for making a second connection between the second winding and the telephone line when said telephone signal path means is in use.

* * * * *